United States Patent Office

2,748,165
Patented May 29, 1956

2,748,165

PROCESS FOR THE SIMULTANEOUS PRODUCTION OF PHENOLS AND OXIMES

Hugo Kroeper, Heidelberg, and Georg Hummel, Mannheim, Germany, assignors to Badische Anilin- & Soda-Fabrik Aktiengesellschaft, Ludwigshafen (Rhine), Germany No Drawing. Application July 14, 1954,
Serial No. 443,435

6 Claims. (Cl. 260—566)

This invention relates to a process for the simultaneous production of phenols and oximes.

We have found that phenols and oximes are obtained simultaneously by treating aryl-substituted alkyl- or cycloalkyl-hydroperoxides with acid aqueous solutions of hydroxylamine salts or with hydroxylamine sulfonic acids.

Aryl-substituted alkyl- or cycloalkyl-hydroperoxides are obtained, for example, in a simple known manner by treating aryl-alkanes or arylcycloalkanes, such as cumene, isopropylnaphthalene or cyclopentyl-, cyclohexyl- or dicyclohexyl-benzene, -toluene or -naphthalene, preferably in aqueous suspension, with molecular oxygen.

The hydroperoxides, as such or in the form of their solutions, for example in the non-hydroperoxylated initial materials, are stirred into aqueous acid solutions of hydroxylamine salts or of hydroxylamine sulfonic acids. It is advantageous to use at least one or one to two moles of hydroxylamine salt or hydroxylamino sulfonic acid with reference to the hydroperoxide. The reaction takes place in an acid medium, for example with the addition of alkali metal bisulfate; the hydroxylamine salts may also be formed during the reaction by the addition of hydroxylamine to a mixture of aqueous acid and the hydroperoxide. The reaction is usually complete after a few hours at ordinary temperature (10–30° C.) or elevated temperatures up to about 100° C.

After separating the aqueous layer, the oily layer of the reaction mixture is separated by fractional distillation into its components, i. e. phenol, oxime and diluent. The oxime can also be separated from the oily layer by extraction with an aqueous solution of a pH value of about 2. The phenol is then preferably extracted from the oily layer by aqueous alkali of a pH value of about 9 to 10.

The yields of phenols and oximes thereby obtained are almost quantitative.

The following examples will further illustrate this invention but the invention is not restricted to these examples. The parts are parts by weight.

*Example 1*

A mixture of about 55 parts of phenylcyclohexylhydroperoxide and 445 parts of cyclohexylbenzene is intensively stirred for 6 hours at 90° C. with 500 parts of a commercial aqueous solution of hydroxylamine monosulfonic acid (corresponding to a hydroxylamine content of 4%) which contains an equimolecular amount of sodium bisulfate. The aqueous solution is adjusted with caustic soda solution to a pH value of 3 to 4, and the layers are separated. From the oily layer there is obtained by fractional distillation 25 parts of phenol (i. e. 92% of the theoretical yield) having the boiling point 80° C. at 10 torr and 30 parts of cyclohexanoneoxime (i. e. 92% of the theoretical yield) having a boiling point of 100° C. at 10 torr and a melting point of 90° to 91° C.

The unchanged cyclohexylbenzene distilled off can be hydroperoxylated and reacted again.

*Example 2*

A solution of 81 parts of cumene hydroperoxide in 370 parts of cumene is heated for 48 hours at 70° C. with 1400 parts of a commercial aqueous hydroxylamine sulfonic acid solution (corresponding to a hydroxylamine content of 4%) which contains an amount of sodium bisulfate equimolecular to that of the hydroxylamine sulfonic acid, until all the hydroperoxide has been consumed. The reaction mixture is adjusted to a pH of 3 with caustic soda solution, the aqueous layer separated and extracted with ether; 11 parts of acetone oxime (boiling point 137° C. and melting point 60° C.) are obtained from the ethereal solution.

The water-insoluble layer is extracted with caustic soda solution, the alkaline solution acidified and extracted with ether. There are obtained 8 parts of phenol (boiling point 80° to 83° C. at 20 torr). In the alkali-insoluble oil there are present cumene and a higher boiling fraction (boiling point 84° to 85° C. at 10 torr) with an oxygen content of about 12%.

*Example 3*

A mixture of 60 parts of phenylcyclohexyl-hydroperoxide, 240 parts of cyclohexylbenzene, 36.5 parts of hydroxylamine sulfate, 25 parts of sodium bisulfate and 200 parts of water is heated at 70° C. for 18 hours while stirring. The hydroperoxide content thus falls to about 6%. The reaction mixture is adjusted to a pH value of 3 to 4 with caustic soda solution and the layers are separated. 18.5 parts of phenol and 22 parts of cyclohexanone oxime (i. e. 88% with reference to the hydroperoxide reacted) are obtained from the oily layer by fractional distillation.

We claim:

1. A process for the simultaneous production of a phenol and an oxime which comprises reacting one mole of a compound selected from the class consisting of phenylcyclohexylhydroperoxide and cumene-hydroperoxide with an aqueous acid solution of from about one to two moles of a member of the group consisting of a hydroxylamine salt and a hydroxylamine-sulfonic acid at from ordinary temperature to about 100° C.

2. A process for the simultaneous production of phenol and cyclohexanone oxime which comprises reacting one mole of phenylcyclohexyl-hydroperoxide with an aqueous acid solution of from about one to two moles of hydroxylamine salts at from ordinary temperature to about 100° C.

3. A process for the simultaneous production of phenol and cyclohexanone oxime which comprises reacting a solution of one mole of phenyl-cyclohexyl-hydroperoxide in cyclohexyl-benzene with an aqueous acid solution of from about one to two moles of hydroxylamine salts at from about 70° to 90° C.

4. A process for the simultaneous production of phenol and acetone-oxime which comprises reacting a solution of one mole cumene-hydroperoxide in cumene with an aqueous acid solution of from about one to two moles of hydroxylamino-sulfonic-acids at from ordinary temperature to about 100° C.

5. A process for the simultaneous production of phenol and cyclohexanone oxime which comprises reacting one mole of phenylcyclohexyl-hydroperoxide with an aqueous acid solution of from about one to two moles of a hydroxylamino-sulfonic-acid at from ordinary temperature to about 100° C.

6. A process for the simultaneous production of phenol and cyclohexanone oxime which comprises reacting a solution of one mole of phenyl-cyclohexyl-hydroperoxide in cyclo-hexyl-benzene with an aqueous acid solution of from about one to two moles of a hydroxylamino-sulfonic acid at from about 70° to 90° C.

No references cited.
}